W. F. ENGLEBRIGHT.
WATER METER.
APPLICATION FILED OCT. 10, 1911.
1,038,327.
Patented Sept. 10, 1912.
2 SHEETS—SHEET 1.
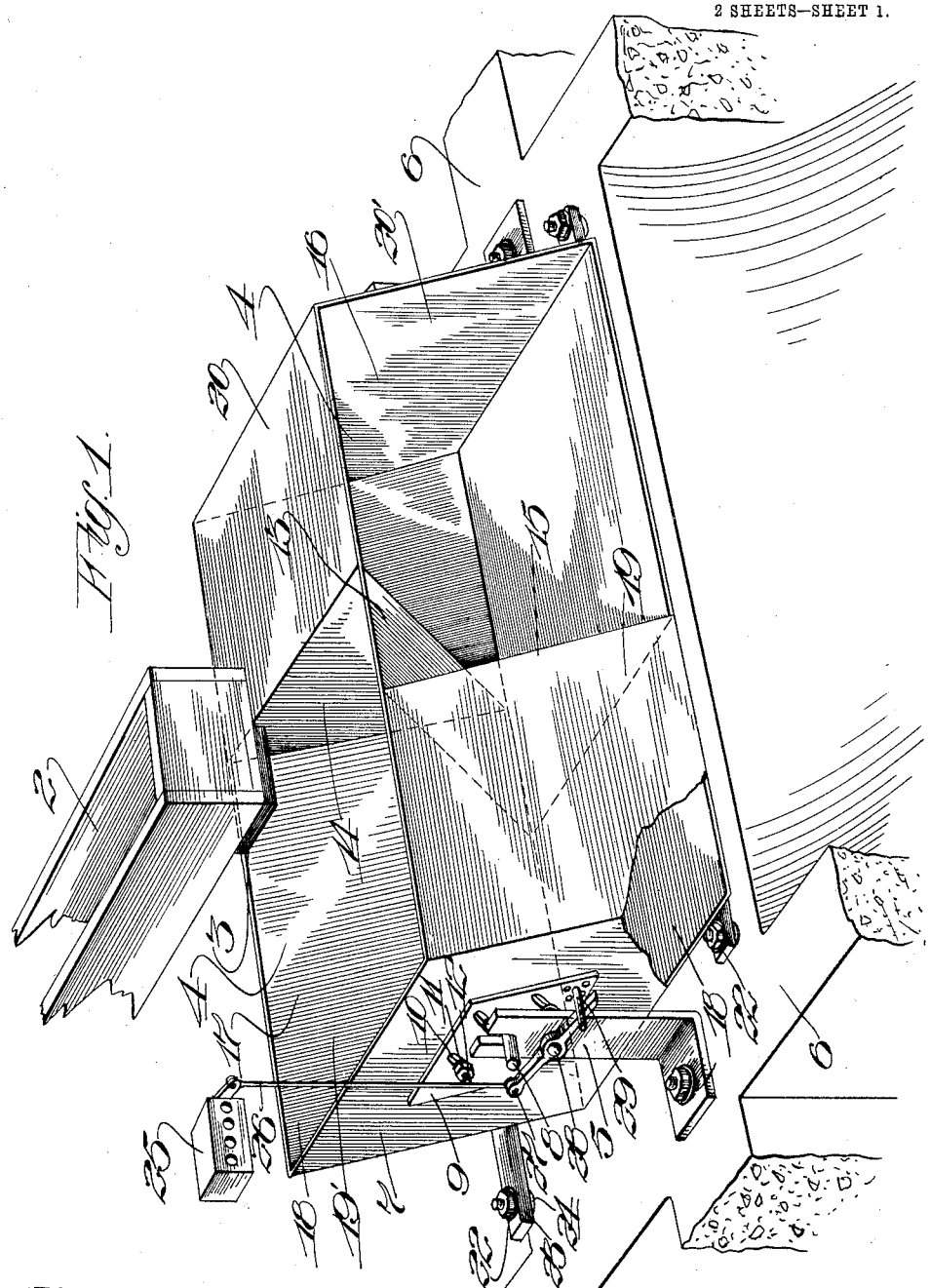

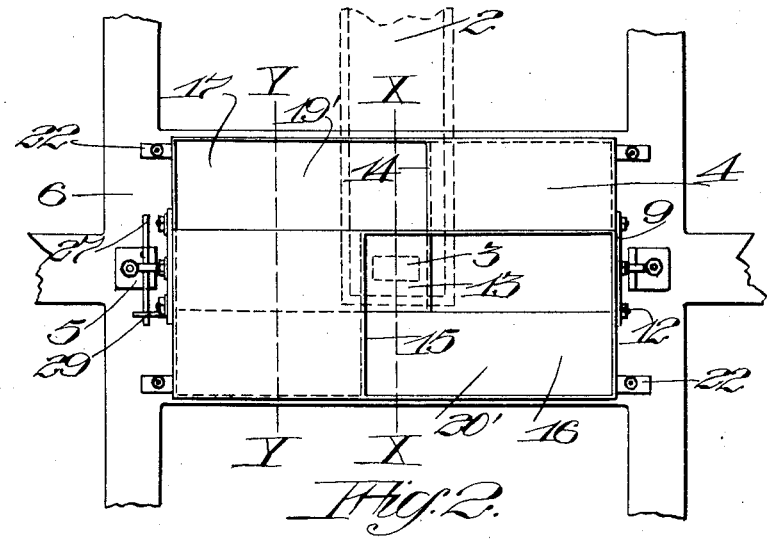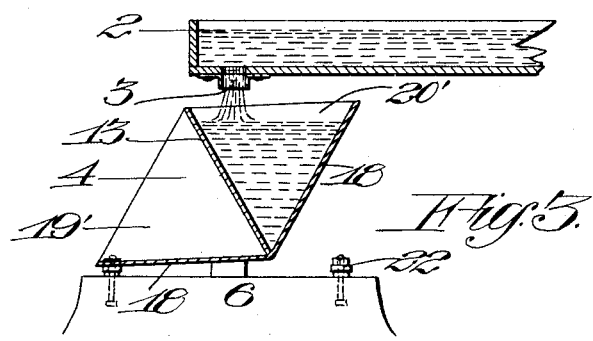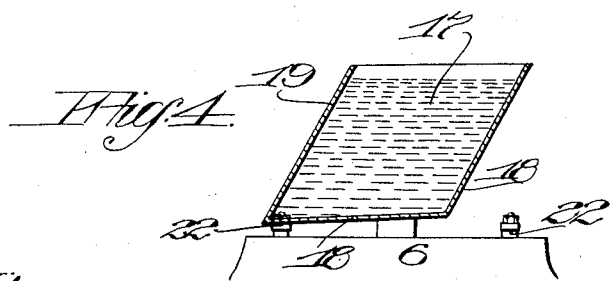

UNITED STATES PATENT OFFICE.

WILLIAM F. ENGLEBRIGHT, OF NEVADA CITY, CALIFORNIA.

WATER-METER.

1,038,327.  Specification of Letters Patent.  Patented Sept. 10, 1912.

Application filed October 10, 1911. Serial No. 653,924.

*To all whom it may concern:*

Be it known that I, WILLIAM F. ENGLEBRIGHT, a citizen of the United States, residing at Nevada City, in the county of Nevada and State of California, have invented new and useful Improvements in Water-Meters, of which the following is a specification.

This invention relates to an apparatus for measuring fluid, and particularly to a meter for measuring water.

The object of the present invention is to provide an automatically operable, accurate and substantial meter or device for continuously measuring water as it is derived from a suitable source; and particularly to provide a substantial and capacious apparatus for measuring water derived from a source in which the supply may be variable.

It is also an object of the invention to provide a substantial meter involving in combination a registering device actuated by the meter, and which meter may be operated continuously without requiring attention and without requiring a large head or fall of water.

It is another object of the invention to provide a water meter adapted to measure large volumes of water, and which is capable of fine adjustment.

The invention consists of the parts and the construction and combination of parts, as hereinafter more fully described and claimed, having reference to the accompanying drawings, in which—

Figure 1 is a perspective view of the apparatus. Fig. 2 is a plan view of the same. Fig. 3 is a transverse section on line X—X, Fig. 2. Fig. 4 is a transverse section on line Y—Y, Fig. 2.

The present apparatus is devised and provided for the measurement of running fluids, such as water, derived from a canal, flume, ditch or other suitable source 2, the water being discharged from the source in the present instance through a rectangular discharge 3.

The meter in the present instance comprises a substantial bucket 4 being, in general, lozenge-shaped in cross-section. The meter bucket 4 is adapted to tilt from side to side upon suitable bearings 5, which may be secured or otherwise rigidly mounted in a base 6, which may be of concrete or other material.

In order to provide for fine adjustments of the bucket 4 upon its supports 5, I secure to the diamond-shaped ends 7 of the bucket axially projecting gudgeons or pins 8 which are rigidly secured in plates 9. The plates 9 in the present instance are provided with a number of slots 10 some of which radiate from the center of the gudgeons 8, and rigidly secured to the end plates 7 are a number of bolts 11 adapted to project through the slots 10. The plate may be securely fastened against the end 7 and upon the bolts 11 by nuts or other locking devices 12.

The bucket 4, in the present instance, as stated, is lozenge-shaped in cross-section substantially from end to end, and is here shown as being divided by a diametric panel 13 running across the shorter diameter of the cross-section of the bucket. This panel 13, which is in the plane of the short diameter of the bucket, may be of any width, and bent at right angles to its edges are triangular partition walls 14 and 15. The bucket 4 is thus divided into two separate and distinct chambers 16—17, the larger portion of each chamber being substantially diamond-shaped in cross-section, but that portion of the chamber 16—17 overlapping at the panel 13 causes the chambers at their overlapping portions to assume a substantially triangular cross-section.

The bucket 4 is provided with a continuous bottom 18, running from end to end, and the bucket is provided at its ends with oppositely inclined panels 19—20, forming at the upper side of the bucket open mouths, indicated at 19'—20'.

When erected in position, the supports 5 of the bucket are adjusted so that the gudgeons 8 will be approximately in line with the length of the conduit discharge 3, and preferably the width of the panel 13 is somewhat greater than the length of the oblong discharge 3.

In operation the bucket tilts to one or the other side of the supports 5 to a position shown in Fig. 4, and at which time water will flow through the discharge 3 into the triangular portion of one or the other of the bucket chambers 16—17 and will accumulate in that chamber, the bottom of which will be substantially horizontal, as shown in Fig. 4. As the incoming water continues to accumulate in that part of the bucket having its mouth uppermost and its bottom substantially horizontal, the mass of water in the lozenge-shaped bucket chamber will cause the bucket to remain in such tilted position and hold the water until a sufficient quantity has been collected as will result in the overbalancing of the bucket by the accumulation of water in the triangular portion of the chamber being filled.

At the instant the weight of the water on one side of the gudgeons 8 is sufficient to overcome the load in the under portion of the bucket, the latter will be automatically tilted and the water in the filled chamber will run over the upper edge of the mouth of the bucket; the movement of the latter continuing downward until it engages an adjustable stop 22, one of which is provided on each side of the fulcrums 5, and upon which the longitudinal edges of the bucket are adapted alternately to rest.

The automatic tilting of the bucket is insured so long as water continues to flow into whichever of the chambers of the bucket has its mouth uppermost and in position to receive the water flowing through the discharge 3. Thus, after one of the compartments of the bucket have been sufficiently filled so that that portion of the water in the triangular part of the compartment will be sufficient in weight to overcome the inertia of the bucket, the latter will start to tilt and thus pour the water from its edge into a runway, not shown.

As the bucket is automatically tilting so as to discharge the contents from one of its compartments, the dividing panel 13 will swing below the discharge 3 and divert the incoming water to the other compartment which has previously been discharged of its contents.

The stop strips 22 are adapted to be vertically adjusted so as to limit the movement of the bucket to the desired point, and this adjustment of the strips 22 may be accomplished by mounting them upon pins 23 or other devices, about which may be placed shims or washers 24 of such thickness as will elevate the stop strips 22 the desired distance. It will thus be seen that the present device is capable of receiving water or other fluid from a source of supply in which the volume of fluid may vary constantly, and yet the water in passing through the bucket 4 will be measured in regular volumes of any desired unit, as, for instance, gallons, cubic feet, etc., and it is an important purpose of the present invention to provide in combination with the meter bucket, a device actuated thereby upon which will be registered automatically the volumes of water or other fluid passing through the meter. In the present instance, the volume registering device comprises a counting mechanism 25 mounted in convenient relation to the tiltable bucket 4, from which device extends an operating link 26 connected to and actuated by a lever 27 fulcrumed at 28 upon one of the supports 5; the opposite end of the lever projecting sufficiently to be engaged by an adjustable pin or other device 29 mounted on the bucket 4.

The bucket as a whole is substantially lozenge-shaped in cross-section, two of the sides being continuous from end to end and forming the V-shape bottom of the bucket, which latter is divided into two equal chambers, the portions of which near the ends are diamond-shaped in cross-section.

The lozenge-shaped bucket chambers are provided with overlapping portions at the middle of the bucket; these overlapping parts being arranged on opposite sides of the diametral panel, which panel thus forms the common wall between the reduced or triangular chamber portions.

Each chamber of the bucket may be considered as being formed of two prisms of equal transverse area, but of unequal length and placed base to base, thus forming a lozenge cross area. The longer prisms are indicated as placed on opposite sides of the bucket, so that the inner ends overlap at the dividing, diametral panel.

Having thus described my invention, what I claim and desire to secure by Letters Patent is—

1. A fluid measuring apparatus comprising a tiltable bucket divided into two equal chambers, said chambers being in part lozenge-shaped in cross-section, and in part triangular in cross-section.

2. A water measuring apparatus comprising a bucket having a substantially diamond shaped cross-section, bearings upon which the bucket will tilt longitudinally, and adjustable gudgeons secured to the bucket and resting on said bearings, said bucket being divided into two equal chambers.

3. A water measuring apparatus comprising a bucket having a substantially diamond shaped cross-section, bearings upon which the bucket will tilt longitudinally, adjustable gudgeons secured to the bucket and resting on said bearings, said bucket being divided into two equal chambers, and a central, diametral dividing panel forming bucket compartments.

4. A liquid meter comprising a bucket having a diamond-shaped cross-section, and divided into a plurality of chambers of equal volume, said chambers having overlapping portions.

5. A liquid meter comprising a bucket having a diamond-shaped cross-section, and divided into a plurality of chambers of equal volume, said chambers having overlapping portions, adjustable gudgeons secured to the bucket, and bearings upon which the gudgeons rest.

6. A liquid meter comprising a bucket having a diamond-shaped cross-section, and divided into a plurality of chambers of equal volume, said chambers having overlapping portions, adjustable gudgeons secured to the bucket, bearings upon which the gudgeons rest, and longitudinally adjustable stops upon which the edges of the bucket may abut when the latter is tilted.

7. In a fluid measuring apparatus, the combination of a source of fluid supply having a discharge and a bucket divided into two substantially equal chambers with overlapping portions, into which portions the fluid may flow from said discharge.

8. In a fluid measuring apparatus, the combination of a source of fluid supply having a discharge, and a bucket divided into two substantially equal chambers with overlapping portions, into which portions the fluid may flow from said discharge, said bucket having a diametral panel adapted to oscillate beneath the discharge.

9. In a fluid measuring apparatus, the combination of a source of fluid supply having a discharge, and a bucket divided into two substantially equal chambers with overlapping portions, into which portions the fluid may flow from said discharge, said bucket having a diametral panel adapted to oscillate beneath the discharge, and supports on which the bucket may oscillate.

10. In a fluid measuring apparatus, the combination of a source of fluid supply having a discharge, and a bucket divided into two substantially equal chambers with overlapping portions, into which portions the fluid may flow from said discharge, said bucket having a diametral panel adapted to oscillate beneath the discharge, supports on which the bucket may oscillate, and a counting mechanism actuated by said bucket.

In testimony whereof I have hereunto set my hand in the presence of two subscribing witnesses.

WILLIAM F. ENGLEBRIGHT.

Witnesses:
JOHN H. HERRING,
CHARLES EDELMAN.

Copies of this patent may be obtained for five cents each, by addressing the "Commissioner of Patents, Washington, D. C."